United States Patent
Wu et al.

(10) Patent No.: US 6,518,230 B2
(45) Date of Patent: Feb. 11, 2003

(54) SOLVENT FOR DISSOLVING CURED ADHESIVE

(75) Inventors: Quansheng Wu, Dongguan (CN); Yu Fu, Dongguan (CN); Zhanqiu Tian, Dongguang (CN)

(73) Assignee: Sae Magnetics (H.K.) Ltd., Hong Kong (CN)

( * ) Notice: Subject to any disclaimer, the term of this patent is extended or adjusted under 35 U.S.C. 154(b) by 107 days.

(21) Appl. No.: 09/811,126

(22) Filed: Mar. 16, 2001

(65) Prior Publication Data

US 2002/0061826 A1 May 23, 2002

(30) Foreign Application Priority Data

Sep. 30, 2000  (WO) ............................ PCT/CN00/00295

(51) Int. Cl.⁷ .................................................. C11D 3/18
(52) U.S. Cl. ...................... 510/200; 510/213; 510/407; 510/505
(58) Field of Search ................................ 134/1, 38, 40, 134/42; 510/200, 213, 412, 505, 407

(56) References Cited

U.S. PATENT DOCUMENTS 5,421,897 A  *  6/1995  Grawe

FOREIGN PATENT DOCUMENTS

| CN | 1050055 A | 3/1991 | ............. C23G/5/32 |
| CN | 1103964 A | 6/1995 | ............. G03F/7/42 |
| EP | 0 105 742 A1 | 9/1983 | ............. C09D/9/00 |
| RU | 2001079 C1 | 10/1993 | ............. C09D/9/04 |
| SU | 1636434 A | 3/1991 | ............. C09D/9/02 |

* cited by examiner

Primary Examiner—Gregory E. Webb
(74) Attorney, Agent, or Firm—Kenyon & Kenyon

(57) ABSTRACT

A new solvent formulation is invented for removing cured adhesive and coating. It solves the problem that crosslink polymers only can be swelled, and a mechanical force has to be applied to remove the adhesive. The new solvent can dissolve the UV cured crosslink polymers very fast and clean the substrate meanwhile.

3 Claims, 1 Drawing Sheet

SOLVENT FOR DISSOLVING CURED ADHESIVE

BACKGROUND OF THE INVENTION

The present invention generally relates to a new chemical formation, and more specifically, to a solvent for removing cured adhesives and coatings on a member, which include UV mercaptoester modified acrylate, UV acrylate, acid cured or a thermoplastic; a salvaging component of electronic products; and salvaging both wire and wireless types of suspensions for a Head Gimble Assembly of a disk drive.

In an HGA manufacturing process, adhesive is generally applied for bonding a slider and a suspension, as shown in FIG. 4. For example, Japanese Patent Application No. 9-347678 discloses a method utilizing anisotropic conductive adhesive or the like to bond a head slider fixedly to a suspension to electrically connect the head slider to the suspension. When it is necessary for a suspension or slider to be salvaged, the adhesive needs to be cleaned up. However, a prior art solvent can only swell the adhesive and a subsequent mechanical force is applied for complete removal. As the suspension is very precise and soft, salvage yield is very low.

SUMMARY OF THE INVENTION

Consequently, a new solvent is presented according to the present invention so as to overcome these problems.

One object of the present invention is to provide a solvent for complete removal of adhesive on a member without damage to the trace.

Another object of the present invention is to provide a process for complete removal of adhesive using the solvent.

In one aspect of the present invention, a solvent for removing cured adhesives and coatings comprises about 50% (Vt) Saturated Sodium Hydroxide ethanol solution, about 50% (Vt) Acetone, and a small amount of surface agent.

In another aspect of the present invention, a process for removing cured adhesives using the solvent comprises following steps:

mixing well the components of the solvent together so that they form a uniformly mixed solution;

immersing a member from which cured adhesive needs to be removed into the mixing solution for 5–20 minutes so that the adhesive on the member is removed; and cleaning the member in water.

The solvent in accordance with the present invention can dissolve the cured crosslink adhesive and coating on a member very quickly by immersing the member into a solution comprising the solvent, clean the substrate, and prevent the discoloration of the substrate so that the processes become more compact and simple and the salvage yield is increased from about 50% to about 80% (counting by suspension).

Moreover, the solvent in accordance with the present invention, or a solution comprising the solvent has no side effect to the environment.

Other objects, features and advantages of the present invention will become more apparent from the detailed description of preferred embodiments of the present invention with the accompanying drawings.

DETAILED DESCRIPTION

Figures 1, 2, 3:
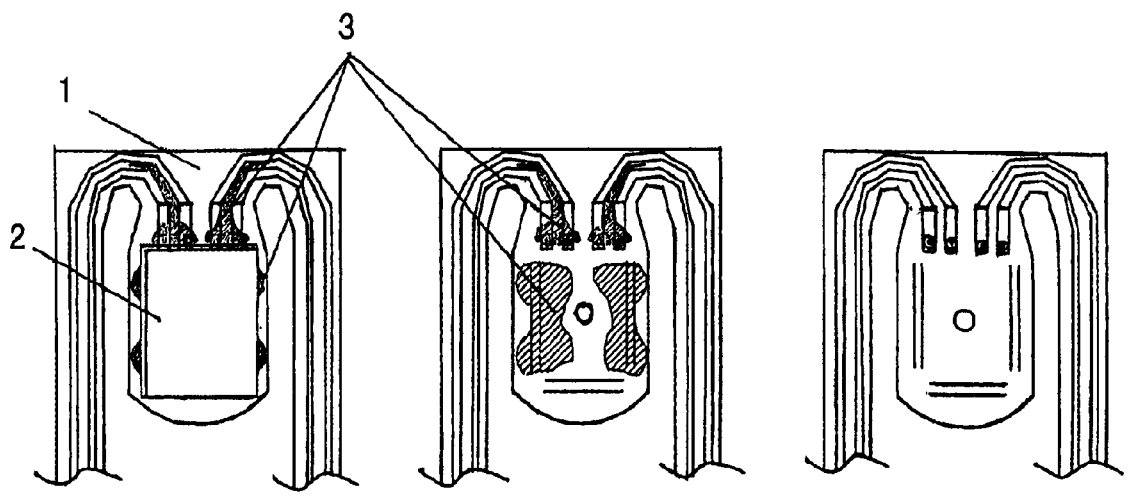
FIG. 1 is a diagram showing a head gimbal assembly.
FIG. 2 is a diagram showing an HGA with adhesive bonding.
FIG. 3 is a diagram showing a slider and suspension with adhesive removed.

Referring to FIGS. 1 and 2, FIG. 1 shows a head gimbal assembly, and FIG. 2 shows an HGA with adhesive bonding to be removed. As shown in FIGS. 1 and 2, numeral 1 designates a gimbal, 2 a slider, and 3 a cured adhesive, respectively.

In the present invention, a base and a solvent have different functions to the cured adhesive. The solvent can swell the cured adhesive, and the base can decompose and dissolve it. The solvent swells the adhesive to help the base permeate into the cured adhesive, and the base decomposes and dissolves the surface adhesive and helps the solvent to swell the lower layer of cured adhesive. Both of them cooperate, and react with each other.

The formulation of the solvent of the present invention is as follows.

| Chemical | Content(Vt%) |
| --- | --- |
| Saturated Sodium Hydroxide ethanol solution | ~50% |
| Acetone | ~50% |
| Surface agent | Small Amount |

These components of the solvent are mixed well together so that they form a mixing solution. During manufacture of the HGA, members from which cured adhesive needs to be removed are immersed into the mixing solution for 5–20 minutes so that the adhesive on the members is removed, and then the members are cleaned in water.

FIG. 3 shows a slider and a suspension with adhesive removed after immersion in the solution.

Figure 4:
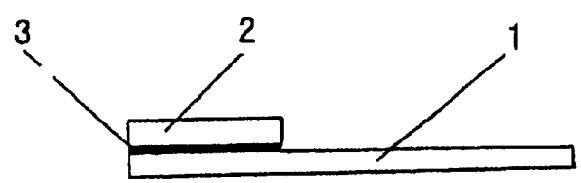
FIG. 4 is a sectional view of an HGA.

FIG. 4 is a sectional view of an HGA in accordance with the present invention. As shown in FIG. 4, numerals identical to those in FIGS. 1 and 2 designate identical elements.

Various modifications will become possible for those skilled in this art based on the teachings of the present disclosure without departing from the scope thereof defined in the appended claims.

What is claimed is:

1. A solvent for removing cured adhesives and coatings comprising: about 50% (Vt) Saturated Sodium Hydroxide ethanol solution, about 50% (Vt) Acetone, and a surface agent.

2. A process for removing cured adhesives using a solvent comprising:

mixing well about 50% (Vt) Saturated Sodium Hydroxide ethanol solution, about 50% (Vt) Acetone, and a surface agent together so that they form a uniformly mixed solution;

immersing a member from which cured adhesive needs to be removed into the mixing solution sufficiently so that the adhesive on the member is removed; and cleaning the member in water.

3. The process of claim 2 wherein in said immersing step, the member is immersed into the mixing solution for 5–20 minutes.

* * * * *